Inventor:
Cornelius B. Murphy,
by Charles W. Helzer
His Attorney.

United States Patent Office 3,410,662
Patented Nov. 12, 1968

3,410,662
THERMOPARTICULATE ANALYSIS OF NITROGENOUS MATERIALS
Cornelius Bernard Murphy, Scotia, N.Y., assignor to General Electric Company, a corporation of New York
Filed Mar. 29, 1965, Ser. No. 443,377
8 Claims. (Cl. 23—230)

ABSTRACT OF THE DISCLOSURE

A process and apparatus for the detection and measurement of trace amounts of complex nitrogenous organic compounds in an oxygen containing gas such as air. The gas stream is passed through a pyrolyzer where the nitrogenous organic compound is oxidized to produce nitrogen dioxide, water vapor and carbon dioxide and the nitrogen dioxide hydrolyzed to produce nitric acid which is then reacted with ammonia to produce ammonium nitrate particles, or nuclei, which are then measured in a condensation nuclei detector. Filters are provided to remove background particles which may be present in the original gas sample or unoxidized carbon particles resulting from the pyrolysis. Amounts of organic compounds as low as 0.000001 gram per liter of air have been readily detected and measured by this method.

---

This invention relates to a method of thermoparticulate analysis.

More particularly, the invention relates to a new and improved method for thermo-particulate analysis of nitrogenous materials.

Thermo-particulate analysis is a new method of chemical analysis of materials made possible by the introduction of the General Electric Company's condensation nuclei detector. The condensation nuclei meter is an automatically operating instrument for providing a count of the number of small particles (called condensation nuclei) that may be entrained in a given gaseous sample. Thermo-particulate analysis involves the conversion of a material to be analyzed into a gaseous substance which in turn can be converted into particles by any one of a number of known chemical conversion techniques such as hydrolysis, acid-base chemical reaction, photo-chemical conversion, pyrolysis, etc., and subsequently detecting the particles resulting from the conversion with the condensation nuclei meter. For a more detailed description of the technique of thermo-particulate analysis, reference is made to an article entitled "Condensation Nuclei, A New Technique For Gas Analysis," by F. W. Van Luik and R. E. Rippere appearing in Analytical Chemistry, volume 34, page 1617, November 1962, and to an article entitled "TPA—A New Method For Thermal Analysis of Polymeric Materials," by C. B. Murphy, F. W. Van Luik, and A. C. Pitsas, appearing in Plastics Design and Processing Magazine, July 1964 issue.

The present invention relates to a new and improved method of thermo-particulate analysis of nitrogenous materials which method employs a condensation nuclei meter.

In practicing the invention, a method of detecting nitrogenous materials with the condensation nuclei meter is provided which comprises pyrolytically converting the nitrogenous materials to be detected in an oxygen atmosphere to nitrogen dioxide, chemically reacting nitrogen dioxide with water to form nitric acid droplets that act as condensation nuclei, and detecting in the condensation nuclei thus produced with the condensation nuclei detector.

Other objects, features and many of the attendant advantages of this invention will be appreciated more readily as the same becomes better understood by reference to the following detailed description, when considered in connection with the accompanying drawings, wherein like parts in each of the several figures are identified by the same reference character, and wherein.

In the above-referenced paper by Van Luik and Rippere, a method of detecting nitrogen dioxide ($NO_2$) is described which involves conversion of the nitrogen dioxide to nitric acid particles by hydrolysis, and subsequent direct detection of the nitric acid particles in a condensation nuclei detector. This method of detection is adequate for relatively simple nitrogen compounds such as $NO_2$ which are already partially oxidized, although it requires very precise operation of the condensation nuclei meter insofar as pressure adjustments to the meter are concerned. The present method of thermo-particulate detection of nitrogenous materials is intended for use with much more complex nitrogenous materials than $NO_2$ such as those which will be recited hereinafter, and obviates the need for such precise adjustments to the condensation nuclei meter, as well as to improve the sensitivity of the over-all method to smaller particle sizes.

Figure 1:
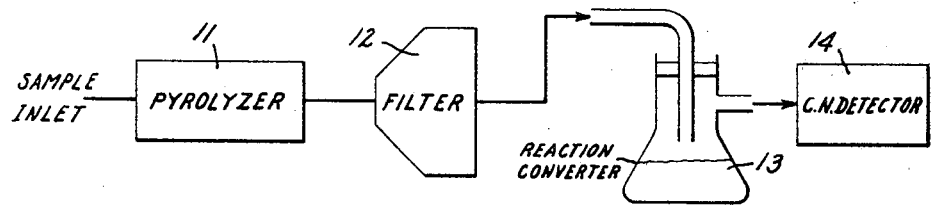
FIGURE 1 is a functional block diagram of an apparatus used in carrying out the new and improved thermo-particulate method of detecting nitrogenous materials made possible by the present invention.

In carrying out the new and improved method of thermo-particulate analysis in accordance with the present invention, an apparatus arrangement such as that shown in FIGURE 1 is used. In FIGURE 1 the sample of nitrogenous material to be detected is introduced in gaseous form through an appropriate sample inlet into a pyrolyzer 11. The pyrolyzer 11 may be of any conventional type such as a heated wire pyrolyzer or an impaction type pyrolyzer with which the temperature at which pyrolytic conversion of the nitrogenous sample gas can be achieved in an oxygen atmosphere, and wherein the temperature at which conversion takes place can be closely controlled. One suitable form of a pyrolyzer construction for this purpose is described in a paper appearing in the Journal of Applied Polymer Science, volume 7, issue 3, 1963, entitled "Introduction of Polymer Samples Into A Microreactor," appearing on pages S19–S21. However, it is to be expressly understood that operation of the present method is not restricted to this particular pyrolyzer construction but that any conventional pyrolyzer capable of achieving the desired pyrolytic conversion in an oxygen atmosphere within the temperature ranges hereinafter cited, can be employed.

It is anticipated that the oxygen required for the pyrolytic conversion will be present in the air introduced into the sample inlet along with the gaseous nitrogenous material to be detected, and that therefore the oxygen partial pressure in the pyrolyzer will be fixed. As a result, the temperature at which the pyrolyzer is operated, will be the controlling factor in the oxidation of the nitrogenous compound by pyrolytic action. It is further anticipated that the pyrolyzer will be operated in the temperature range of from 700° C. to 950° C. so as to generally assure the complete conversion of the nitrogen in the nitrogenous gaseous sample to nitrogen dioxide ($NO_2$). This temperature range ensures pyrolytic conversion of the nitrogen to nitrogen dioxide. In many instances, the conversion will occur at significantly lower temperatures depending upon the specific nitrogenous material being detected.

After the high temperature oxidative conversion of the nitrogen in the gaseous sample in the pyrolyzer to $NO_2$, the $NO_2$ is then supplied from the output of the pyrolyzer 11 through a standard Gelman type filter 12 to the input of a reaction converter vessel 13. The filter 12 serves to remove any carbon particles that might be entrained in the $NO_2$ as a result of the pyrolytic action taking place in pyrolyzer 11. The reaction converter 13 preferably contains an aqueous solution of ammonia so that only a single reaction converter vessel 13 is required. However, it would be possible by the employment of two reaction converter vessels one containing water and the other containing ammonia to carry out the process equally well. With either form of practicing the invention, the reactions that take place are as follows. The cooled pyrolyzer effluent containing $NO_2$ is entrained over the aqueous solution of ammonia contained in the reaction converter vessel 13. The $NO_2$ reacts with the water to form nitric acid ($HNO_3$) in accordance with the reaction process:

$$4NO_2 + O_2 + 2H_2O \rightarrow 4HNO_3 \qquad (1)$$

The nitric acid then reacts with the ammonia to form ammonia nitrate particles in accordance with the reaction process:

$$HNO_3 + HN_3 \rightarrow NH_4NO_3 \qquad (2)$$

Although these two reactions are distinguishable, they readily occur almost simultaneously when the cooled pyrolyzer effluent is entrained over the aqueous solution of ammonia. When thus treated the air provides the oxygen required for the reaction process, while the aqueous solution of ammonia provides both the water and the ammonia needed for the gas phase reaction. The ammonium nitrate particles are then supplied from the reaction converter vessel 13 to the input of a condensation nuclei detector 14 where they serve as condensation nuclei particles.

The condensation nuclei detector 14 is described more fully in U.S. Patents No. 2,684,008 and No. 3,037,421, as well as in the above-referenced articles by Van Luik et al. and Murphy et al. Briefly, however, the gaseous sample containing the particles to be detected and measured is drawn through the instrument by a vacuum pump. The gaseous sample first enters a humidifier comprising a part of the detector where its relative humidity is raised to about 100% with water. The humidified sample then passes through a rotating valve into a cloud chamber where it is expanded adiabatically by the valving and transport system. This causes the sample to cool and the relative humidity to rise to any desired super-saturation up to about 400%. As a consequence, condensation takes place on the particles as condensation centers so that a cloud of water droplets is formed with each droplet containing an airborne nucleus. The cloud of water droplets is then measured by a dark field optical system including photomultipliers which measure the scattering effect on light of the water droplets. The amount of light scattering is proportional to the number of droplets in the sample, and this in turn is proportional to the number of particles contained in the gaseous sample introduced into the detector. After measurement by the optical system, the sample is then flushed out of the detector through the rotation valve and discharged in the exhaust of the vacuum pump.

A complete measurement cycle may be varied from three to ten times per second although normal operation is about five cycles per second. The complete sequence of events for any sample from intake and humidification to expansion, measurement and discharge plus the time needed for the instruments to respond can be in the order of 1.5 seconds. The output indication contained from the detector is in the form of an electrical signal produced by the multiplier phototube employed in the dark field optical system. The condensation nuclei detector can detect concentrations as small as 10 or as large as $10^7$ particles per cubic centimeter of gaseous samples. Sample flow can be varied from 20 to several hundred cubic centimeters of gas per second by adjusting a critical orifice in the rotating valving system. The detector is extremely sensitive in that it can detect about $10^4$ molecules of material in $10^{19}$ molecules of air or about one part in $10^{15}$.

Condensation nuclei particles may be liquid or solid sub-microscopic airborne particles, each of which can act as the nucleus for the formation of a water droplet. Their size may vary from .001 to .1 micron in diameter. Such nuclei are found in nature, or may be created artificially as in the present process, and may range in concentration from a few hundred to hundreds of thousands per cubic centimeter of the gaseous volume in which they are entrained. The nucleus derives its name from its triggering role in causing super-saturated water vapor to condense into droplets. Water vapor in air that contains no particles will not start to condense into droplets until the air is 800% super-saturated. The time required for the growth process from nucleation at about .001 micron in diameter to a visible droplet having a size of about 1 micron diameter is in the order of 7 milliseconds. This speed of growth is an important factor in the detector, and the growth in size of the particle provides an amplification factor which can be utilized to give extreme sensitivity to this method of measurement.

One of the important conditions affecting sensitivity of the method of thermo-particulate analysis herein proposed is the dwell time between the creation of the condensation nuclei and the measurement of their concentration in the condensation nuclei detector. The method of detecting $NO_2$ previously reported in the above-identified Van Luik and Rippere article by means of the reaction of nitric acid and water, requires critical settings of the vacuum employed in the operation of the condensation nuclei detector. The conversion process based on this disclosure involving the pyrolytic conversion of nitrogenous materials in an oxygen atmosphere followed by a reaction conversion of the nitrogen dioxide with ammonia, relieves the need for this critical vacuum setting. This is due to the fact that the reaction process provides the additional necessary dwell time, which can be readily controlled by the flow rates, required to allow the nuclei to grow in size so that they can be readily detected by the condensation nuclei detector without requiring critical vacuum settings. In addition, the method appears to provide a means for improving the sensitivity of the technique so that it is capable of detecting extremely small quantities of nitrogenous materials.

As stated above, the sensitivity of the condensation nuclei detector is sufficient to measure from 10 to $10^7$ particles per cubic centimeter. Measurement is made over linear full-scale ranges of 300, 1,000, 3,000, 10,000, 30,000 and 100,000 nuclei per cubic centimeter. In addition to these, two non-linear ranges having full-scale values of $10^6$ and $10^7$ nuclei per cubic centimeter are also provided by the detector. If it is assumed that nuclei having a radius of .01 micron are measured at a concentration of, for example, 100 per cubic centimeter, and it is further assumed that the density of the particles is 1, then the mass of particles being detected is $4 \times 10^{-16}$ grams per cubic centimeter. The small size of this number indicates the value of the condensation nuclei detector in measuring small trace amounts of contaminant in a given volume of a gaseous atmosphere. In a particular case involving piperidine, to be discussed hereinafter, detection of this compound was achieved without difficulty in dilute mixtures on the order of 1 gamma per liter (.000001 gram per liter) of piperidine in a liter of air using the novel method of thermo-particulate analysis comprising this invention.

The following are examples of typical complex nitrogenous materials that can be detected with the present method of thermo-particulate analysis herein disclosed, although it is to be expressly understood that the method is in no way limited to use with these materials, but that these are merely exemplary of the broad applicability of the method. As can be readily determined from an examination of this list, the method is applicable to a wide variety of nitrogen-containing molecular species; as well as to aerosols formed of polymeric materials such as proteins and bacteria. With respect to these example, it should be noted that the reactions cited are carried through only the oxidation of the nitrogenous material by pyrolytic action, and that thereafter the further reaction of the resulting $NO_2$ with water to form nitric acid, and the reaction of the nitric acid with ammonia to form ammonia nitrate particles which are used as condensation nuclei in the detection process, would be the same as cited in expressions (1) and (2) above. Further, it is believed obvious that the reactions herein disclosed involve the reaction of $NO_2$ with water to form nitric acid droplets that then can be detected with the condensation nuclei detector. Preferably, however, the acid-hydrogen atoms of the nitric acid are reacted with ammonia to form the salt $NH_4NO_3$ that serve as condensation nuclei. It is further obvious that such an electron pair can be provided, amines, hydrazine, and its derivatives, etc., in the formation of the nitrate salts of these materials. Accordingly, to one skilled in the art, it is believed obvious that other substitutions can be made for the specific examples herein cited.

Typical examples of nitrogenous materials detectable by this method of thermo-particulate analysis are:

Piperidine ($C_5H_{11}N$)

$$4C_5H_{11}N + 35O_2 \rightarrow 20CO_2 + 4NO_2 + 22H_2O \quad (3)$$

Pyridine ($C_5H_5N$)

$$4C_5H_5N + 29O_2 \rightarrow 20CO_2 + 4NO_2 + 10H_2O \quad (4)$$

Nitrobenzene ($C_5H_5NO_2$)

$$4C_5H_5NO_2 + 28O_2 \rightarrow 20CO_2 + 4NO_2 + 10H_2O \quad (5)$$

Aniline ($C_6H_5NH_2$)

$$4C_6H_5NH_2 + 35O_2 \rightarrow 24CO_2 + 4NO_2 + 14H_2O \quad (6)$$

Ethyl ester of glycine ($H_2NCH_2COOC_2H_5$)

$$2H_2NCH_2COOC_2H_5 + 11O_2 \rightarrow 6CO_2 + 2NO_2 + 8H_2O \quad (7)$$

Ethylamine ($CH_3CH_2NH_2$)

$$4CH_3CH_2NH_2 + 17O_2 \rightarrow 8CO_2 + 4NO_2 + 14H_2O \quad (8)$$

Ethylnitrate ($C_5H_5ONO_2$)

$$2C_2H_5ONO_2 + 7O_2 \rightarrow 4CO_2 + 2NO_2 + 5H_2O \quad (9)$$

Acrylonitrile ($CH_2=CH-CN$)

$$4CH_2=CH-CN + 19O_2 \rightarrow 12CO_2 + 4NO_2 + 6H_2O \quad (10)$$

Typical of the protein matter which constitute some of the naturally occurring aerosols would be the examples of polyglycine, which would consist of the following structure:

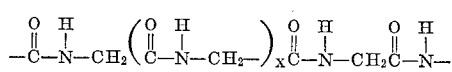

where

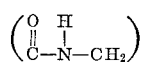

would be the repeating unit. Upon pyrolytic oxidation in the pyrolyzer, this would provide the following products:

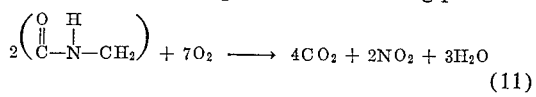

(11)

Figure 2:
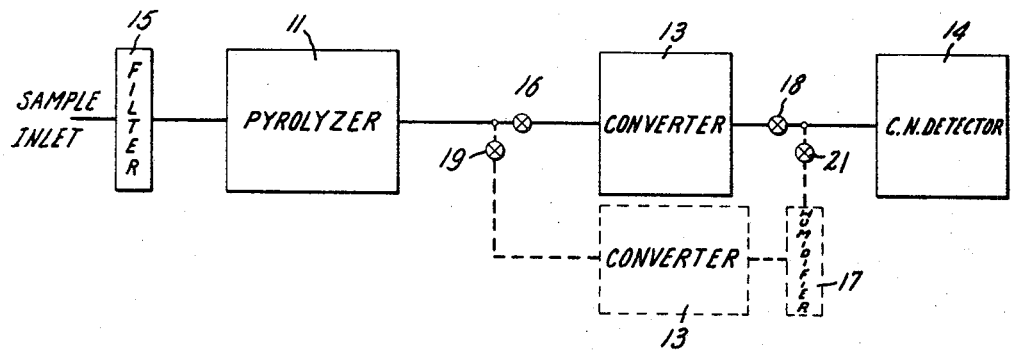
FIGURE 2 is a functional block diagram of an alternate form of apparatus better suited for the detection of certain types of nitrogenous materials.

FIGURE 2 of the drawings illustrates an alternative form of an apparatus for use in carrying out the novel thermo-particulate method of detecting nitrogenous material made possible by the present invention. With the apparatus arrangement of FIGURE 2, a gaseous sample to be analyzed is introduced through a filter 15 into the input of the pyrolyzer 11. The filter 15 may comprise any standard form of filter such as a Gelman-type filter, and serves to filter out any naturally occurring ambient particulates contained in a gaseous sample prior to pyrolytically converting the gaseous sample in pyrolyzer 11. The $NO_2$ resulting from the pyrolytic conversion in pyrolyzer 11 may then be supplied selectively through valve 16, through a humidifier 17 of conventional construction to the reaction converter 13. After conversion in converter 13, the sample then passes through selective valve 18 to the input of the condensation nuclei detector 14. The reaction converter 13 of the arrangement shown in FIGURE 2 contains solid ammonium carbonate $$(NH_4)_2CO_3$$

Alternatively, the nitrogen dioxide appearing in the sample at the output of pyrolyzer 11 may be supplied selectively through a valve 19 to the converter 13 and thence through a humidifier 17 and second valve 21 to the input of condensation nuclei detector 14.

In operation, the gaseous sample to be analyzed after passing through the filter 15 which removes ambient particles, is pyrolytically converted in pyrolyzer 11 to produce $NO_2$. With the first alternative form of the apparatus, the $NO_2$ then passes through the humidifier 17 where it is converted in accordance with expression (2) above to nitric acid, and the nitric acid in passing over the solid ammonium carbonate in converter 13 reacts with ammonia gas given off by the ammonium carbonate to produce ammonium nitrate particles that are supplied to the condensation nuclei detector as set forth below:

$$2HNO_3 + (NH_4)_2CO_3 \rightarrow 2NH_4NO_3 + CO_2 + H_2O \quad (12)$$

By operating the apparatus of FIGURE 2 in the above manner, it is possible to use solid ammonium carbonate in the reactor converter 13. The advantage of operating the apparatus in this manner is that the ammonium carbonate continuously renews the amount of gaseous ammonia available for the reaction process so that its concentration is not depleted during operation of the process. As a consequence, it is not necessary to continually replenish the ammonia as would be required with the arrangement shown in FIGURE 1, for example.

In the event it is desirable to operate with an aqueous solution of ammonium carbonate, the apparatus of FIGURE 2 could be modified to include the arrangement shown in dotted outline form wherein the aqueous solution of ammonium carbonate is contained in the converter 13. A humidifier 17 follows the converter. With such an arrangement, the advantage of not having to continuously replenish the ammonium in the process is still obtained, and in addition, by including the humidifier 17 in a position such as that it follows the reaction converter 13, it is possible to control precisely the growth of the water droplets around the ammonium nitrate particles as condensation centers thereby improving the sensitivity over-all system as well as minimizing the pressure adjustment that has to be made in the operation of the condensation nuclei detector 14.

Figure 3:
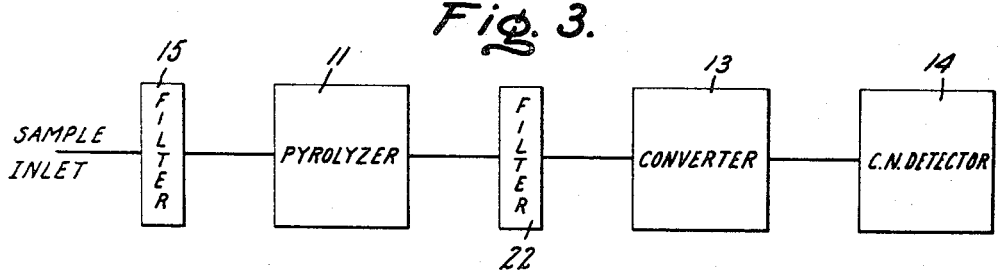
FIGURE 3 is a functional block diagram of still another form of apparatus suitable for carrying out the novel thermo-particulate method of detecting nitrogenous materials in accordance with the invention.

FIGURE 3 of the drawings illustrates still another apparatus arrangement for carrying out the novel process of thermo-particulate analysis in accordance with the invention. In the arrangement of FIGURE 3, a filter 15 is inserted ahead of the pyrolyzer 11 to screen out ambient particles, and an additional filter 22 is inserted between the output of pyrolyzer 11 and the input of the reaction converter 13. By the insertion of filter 22 at this stage of the process, any carbon products that are produced as a result of the pyrolytic action in the pyrolyzer 11, are removed from the effluent sample gas prior to its reaction with the ammonia in converter 13. In other respects, the process is essentially the same as that described earlier with respect to FIGURES 1 and 2.

From the foregoing description, it can be appreciated that the new and improved thermo-particulate method of detecting nitrogenous materials makes available a method for pyrolytically converting the nitrogenous material to be detected in an oxygen atmosphere to nitrogen dioxide, and chemically reacting the nitrogen dioxide with water to form nitric acid droplets that act as condensation nuclei. Preferably, however, the nitric acid is reacted with ammonia to form ammonium nitrate particles that act as condensation nuclei. The method is completed by detecting the condensation nuclei particles thus produced with a condensation nuclei detector. It is believed obvious that the reaction involves the formation of a coordinate covalent bond between the free electron pair on the nitrogen atom of the ammonia with acid hydrogen atoms derived from the nitric acid to form the salt $NH_4NO_3$. It is also believed obvious that such an electron pair can be provided by amines, hydrazine, and its derivatives, etc., in the formation of the nitrate salts of these materials. Accordingly, to one skilled in the art, it is believed obvious that substitutions can be made for the specific examples cited.

Having described several forms of practicing the invention, it is believed obvious that other modifications and variations of the invention are possible in light of the above teachings. It is, therefore, to be understood that changes may be made in the particular embodiments of the invention described which are within the full intended scope of the invention as defined by the appended claims.

What I claim as new and desire to secure by Letters Patent of the United States is:

1. The method of detecting trace amounts of complex organic nitrogenous compounds in a gas with a condensation nuclei detector which comprises pyrolytically converting the compound in the presence of oxygen to nitrogen dioxide, hydrolyzing the nitrogen dioxide in the presence of oxygen to nitric acid droplets, reacting the nitric acid droplets with ammonia gas to produce ammonium nitrate condensation nuclei, and detecting the condensation nuclei thus produced with the condensation nuclei detector.

2. The method set forth in claim 1 wherein the steps of hydrolyzing the nitrogen dioxide and reacting the nitric acid droplets with ammonia are performed substantially concurrently.

3. The method set forth in claim 1 wherein filter means are provided for removing particulate matter from the gas prior to the pyrolyzing step and carbon particles from the gas after the pyrolyzing step and prior to the hydrolyzing and reaction steps.

4. An apparatus for the detection of nitrogenous material comprising pyrolytic converting means for pyrolytically converting nitrogenous materials supplied thereto in an oxygen atmosphere to nitrogen dioxide, at least one reacting chamber operatively coupled to the output of the pyrolytic converting means for reacting the nitrogen dioxide with water in the presence of oxygen and ammonia to form salt particles that act as condensation nuclei, and a condensation nuclei meter operatively coupled to the output of the reaction chamber for detecting the condensation nuclei particles thus produced.

5. The combination set forth in claim 4 further characterized by filter means operatively coupled to the input of the pyrolytic converting means for filtering the nitrogenous materials to be detected prior to pyrolytically converting the same in order to remove ambient particles entrained therein.

6. The combination set forth in claim 4 further characterized by filter means operatively coupled intermediate the output of the pyrolytic converting means and the input of the reaction chamber for filtering the nitrogen dioxide after pyrolysis in order to remove any carbon particles entrained therein as a result of the pyrolytic action.

7. The combination set forth in claim 4 further characterized by humidifying means operatively coupled intermediate the output of the pyrolytic converting means and the input to the condensation nuclei detector ahead of or following the reaction chamber.

8. The combination set forth in claim 4 further characterized by filter means operatively coupled to the input of the pyrolytic converting means for filtering the nitrogenous materials to be detected in order to remove ambient particles entrained therein, additional filter means operatively coupled to the output of the pyrolytic converting means in order to remove any carbon particles entrained therein as a result of the pyrolytic action, and humidifying means operatively coupled intermediate the output of the pyrolytic converting means and the input of the condensation nuclei detector ahead of or following the reaction chamber.

References Cited
UNITED STATES PATENTS

| | | | |
|---|---|---|---|
| 3,094,392 | 6/1963 | Skala | 23—232 |
| 3,117,841 | 1/1964 | Van Luik et al. | 23—232 |
| 3,172,732 | 3/1965 | Hines et al. | 23—230 |

MORRIS O. WOLK, *Primary Examiner.*

R. E. SERWIN, *Assistant Examiner.*